Patented Oct. 15, 1946

2,409,271

UNITED STATES PATENT OFFICE 2,409,271

PROCESS FOR CLEANING ALUMINUM

Natacha Goldowski, Chicago, Ill., assignor to Welding Research, Inc., Chicago, Ill., a corporation of Illinois No Drawing. Application March 22, 1943, Serial No. 480,087

2 Claims. (Cl. 148—6)

The present invention relates to the cleaning of aluminum and aluminum alloys and has more particular reference to a method of cleaning aluminum surfaces to facilitate welding operations thereon, such as electrical spot welding.

An object of the invention is to provide a method for cleaning aluminum which will produce on the metal surface a uniform electric resistant film such as will permit consistent welding and which will also prevent further oxidation.

A further object resides in the provision of a cleaning method for aluminum characterized by the generation of a metallic bisulphate in the presence of nitric acid whereby the desired chemical action on the aluminum takes place for cleaning the same and which gives to the aluminum a passivating film, thus preventing oxidation upon subsequent exposure to the air.

Electrical welding when applied to aluminum alloys requires surface preparation or else a satisfactory welding job can not be secured. The reason for this surface preparation is the fact that aluminum, due to exposure to the atmosphere, is covered with a layer of aluminum oxide. The oxide renders the welding operation difficult and sometimes even impossible since it has a non-uniform resistance, is irregular, and further, the thickness and geometrical structure of the oxide vary as a function of time. Very high resistance renders electrical welding impossible as the accumulation of heat under the electrode tips is then sufficient to melt the metal completely. If the oxide film is irregular the spots will have an irregular shape and consistency can not be obtained. Also unless the welding operation is timed to follow the cleaning immediately the results are different and generally unsatisfactory due to the rapid growth of the oxide film.

In order to provide a suitable surface for the welding of aluminum three conditions are necessary. First, the surface should have a uniform resistance, secondly, the surface film should be uniform and without irregularities, and thirdly, the said film should be stable under normal atmospheric conditions. The achievement of these results for satisfactory industrial use must be easy to perform, cheap and not critical. There are many products on the market capable of cleaning aluminum and providing an adequate surface for welding. However, they have the one common objection in that the welding operation must be performed immediately following the cleaning. Said products, as regards their chemical action, either dissolve the oxide, leaving the metal in a bare state, or they dissolve the surface oxide and also the metal. In both cases the aluminum is left in a bare state and as a consequence the surface starts to oxidize again upon exposure to air. This is the reason why the welding must be done immediately after the cleaning operation.

The method of checking in use up to the present time, was based on the measurement of the electrical resistance. The surface is considered good when the resistance is low and bad when the resistance is high. The present cleaning procedure is based on quite a different method of checking which should be clearly understood in order to gain a proper appreciation of the invention.

A long and systematic study of surface films on aluminum has led me to conclude that there are two different types of film, namely, porous and non-porous. My improved method of determining the surface state is by measurement of the electrochemical potential. When said measurement is performed different types of curves are obtained according to two variable factors. One is the atmosphere surrounding the metal previous to the measurement, and the other is the electrolyte in which the metal remains during said measurement. Besides the absolute value of the electrochemical potential, there is another important factor to be considered, namely, the configuration of the curve. Two types of curves can be obtained, one oscillating, and the other straight. The oscillating curve corresponds to a porous film and the straight curve to a non-porous film. From the standpoint of welding quality, porous film is unsatisfactory as the current flows through the porosities and irregular fusion will result. On the other hand, non-porous film is not objectionable even when the resistance is relatively high since these films will permit consistent welding results. As a mattery of fact, stainless steel, the surface film of which is relatively thick but non-porous, can be welded very easily in spite of its high electrical resistance. Accordingly, it can be stated that measurement of the surface resistance did not give a correct indication of the surface state of the metal for welding purposes.

The curves obtained for the electrochemical potential of aluminum were the principal directive in the selection of the chemical for cleaning aluminum according to the invention. The best straight curve, perfectly stable during twenty-four hours of measurement was obtained with sodium bisulphate. Aluminum samples cleaned with sodium bisulphate gave very consistent results and it was found that satisfactory welding could be performed after different periods of time following said cleaning, such as seven, fifteen, twenty-one, thirty or even forty-five days, with the results being exactly the same.

The invention is not limited to sodium bisulphate as any soluble metallic bisulphate can be used in the cleaning method with satisfactory results. In the practice of the invention the bisulphate is generated in the presence of nitric acid and the amount is proportional to the aluminum in the solution undergoing cleaning. The desired concentration of the bisulphate is automatically secured and in addition other factors such as maintaining proper temperature, checking the pH, and cleaning the tanks, all of which involves work and increases the cost of the welding operation, are eliminated.

The following reactions can be considered as taking place when nitric acid is added to an aqueous solution of sodium sulphate and the solution is used for cleaning aluminum.

1. $Al + Na_2SO_4 + HNO_3 + H_2O =$
2. $AL + NaHSO_4 + NaNO_3 + H_2O =$
3. $AL + NaHSO_4 + HNO_3 + NaOH =$
4. $AL(OH)_3 + NaHSO_4 + NaNO_3 + 3H =$
5. $AL(OH)_3 + Na_2SO_4 + HNO_3 =$
6. $AL(NO_3)_3 + Na_2SO_4 + H_2O$

Referring to Equation 3, it will be seen that the sulphate and the nitric acid have reacted to form the bisulphate and sodium hydroxide, both of which exist in the presence of nitric acid. Equation 4 shows the first chemical action taking place on the aluminum at which time nitric acid is not present but instead the acid and the base have formed the salt, namely, sodium nitrate. In Equation 5 a reduction of the bisulphate has taken place to put back into the solution the sodium sulphate with the formation of nitric acid, which, as shown in Equation 6, reacts with the aluminum hydroxide to form aluminum nitrate and water. In Equation 6 the same sulphate exists as in Equation 1. Therefore it is seen that the sulphate is not used up as is the case with the nitric acid. The sulphate is a necessary ingredient in the cleaning solution although it does not react with the aluminum. Consequently the sulphate does not have to be replaced and can be used indefinitely. Its presence in the solution is that of a catalyzer.

In the place of sodium sulphate I can use any soluble metallic sulphate and absolutely identical results will be secured. In actual practice of the invention I have used nickel sulphate, silver sulphate, and others. The quantity of the bisulphate generated during the cleaning operation is proportional to the amount of aluminum. Therefore as long as nitric acid is present the quantity of the bisulphate will be perfectly constant. When the nitric acid is used up the addition of a corresponding proportion will permit the reaction to continue. In résumé it is apparent that the solution can not be critical as far as concentration is concerned since there is the right concentration or no reaction at all. In the case of alloys of the duraluminum type, that is, alloys containing copper, the presence of nitric acid in the solution is all that is required for cleaning the same. No additional treatment is necessary as the nitric acid dissolves the copper left on the surface after the cleaning of the aluminum.

The temperature of the solution does not play an important role, as the reaction can take place at any temperature. However, the rate of the reaction is a function of the temperature and in order to determine the length of the cleaning procedure the temperature must be considered. In general, it can be said that a high temperature increases the tendency of the chemicals to react. A number of tests conducted on aluminum clad material of different thickness and on duraluminum have proved that at a temperature around the boiling point the time of cleaning can vary from thirty seconds to five minutes without any change in the welding results.

The use of generated bisulphate in the presence of nitric acid produces a passivating film on the cleaned aluminum surfaces which is very desirable since the film has the ability of retarding atmospheric corrosion. The cleaned aluminum surfaces therefore retain their cleanliness for a considerable period of time and the welding operation does not have to be performed immediately but can take place some time following the cleaning. The said film is non-porous and the same has a definite thickness and structure which is independent of the cleaning time and also independent of the temperature of the cleaning solution.

Any reciprocal concentration of nitric acid and sodium sulphate will lead to the same results as the necessary quantity of bisulphate, which is generated, is proportional to the quantity of aluminum involved in the reaction. However, the volume of the sulphate which permits the generation of the bisulphate has to be proportional to the aluminum which has to be cleaned. As to the nitric acid, its concentration will decrease with the reaction. In order to avoid nitric fumes on one hand and provide the necessary volume of bisulphate, the preferred concentration of the solution may be stated as approximately twenty per cent sodium sulphate and ten per cent nitric acid.

What is claimed is:

1. A method of cleaning aluminum to prepare the same for welding, which consists in preparing an aqueous solution essentially consisting of approximately twenty per cent sodium sulphate and approximately ten per cent nitric acid, immersing the aluminum in said aqueous solution whereby sodium bisulphate is generated in the presence of nitric acid to effect the desired chemical action on the aluminum for cleaning the same, and then removing said cleaned aluminum from the solution.

2. A method of cleaning aluminum articles to prepare them for electrical welding, which consists in preparing an aqueous solution essentially consisting of approximately twenty per cent of a soluble metallic sulphate and approximately ten per cent nitric acid, bringing said aluminum articles into contact with the aqueous solution for a period of time ranging from thirty seconds to five minutes, whereby a metallic bisulphate is generated in the presence of nitric acid to effect the desired chemical action on the aluminum for cleaning the same, removing said cleaned articles from the solution and subsequently welding the same, the method being characterized by the fact that a passivating film is produced on the surfaces of the cleaned aluminum thus preventing oxidation upon subsequent exposure to air.

NATACHA GOLDOWSKI.